(12) United States Patent
Isshiki

(10) Patent No.: US 8,675,459 B2
(45) Date of Patent: Mar. 18, 2014

(54) OPTICAL DISK APPARATUS

(75) Inventor: Fumio Isshiki, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 0 days.

(21) Appl. No.: 13/558,393

(22) Filed: Jul. 26, 2012

(65) Prior Publication Data

US 2013/0028063 A1  Jan. 31, 2013

(30) Foreign Application Priority Data

Jul. 27, 2011  (JP) .................... 2011-164103

(51) Int. Cl.
*G11B 7/00* (2006.01)

(52) U.S. Cl.
USPC ............ 369/44.32; 369/44.27; 369/44.11; 369/44.28

(58) Field of Classification Search
None
See application file for complete search history.

(56) References Cited

U.S. PATENT DOCUMENTS

| 7,663,985 B2 * | 2/2010 | Kurokawa et al. ......... 369/44.23 |
| 2007/0064552 A1 * | 3/2007 | Kurokawa et al. ......... 369/44.23 |
| 2011/0063957 A1 * | 3/2011 | Isshiki et al. ............. 369/44.11 |

FOREIGN PATENT DOCUMENTS

| JP | 2006-294189 | 10/2006 |
| JP | 2006-302446 | 11/2006 |
| JP | 2011-65702 | 3/2011 |

* cited by examiner

*Primary Examiner* — Van Chow
(74) *Attorney, Agent, or Firm* — Antonelli, Terry, Stout & Kraus, LLP.

(57) ABSTRACT

The amplitude deviation of a tracking error signal in an optical disk apparatus is reliably corrected by processing signals at low costs. A servo signal generator generates a tracking error signal and a lens error signal from a photodetected signal. A lens error deviation signal memory circuit stores the lens error signal generated at the servo signal generator, and reproduces the one-turn deviation of the lens error signal. A tracking error signal corrector learns an amplitude correcting value for the tracking error signal from the tracking error signal detected in reproducing the one-turn deviation of the lens error signal, and stores the amplitude correcting value in a correcting signal generator.

10 Claims, 14 Drawing Sheets

21: TRACKING ERROR SIGNAL (DPP)
22: LENS ERROR SIGNAL (LE)
24: TRACKING ERROR SIGNAL CORRECTOR
25: SERVO SIGNAL GENERATOR
28: CORRECTING SIGNAL GENERATOR
29a: OFFSET CORRECTING SIGNAL
45: LENS ERROR DEVIATION SIGNAL MEMORY CIRCUIT
55: AMPLITUDE CORRECTING GAIN SIGNAL
59: GAIN-CORRECTED TRACKING ERROR SIGNAL

FIG. 6A
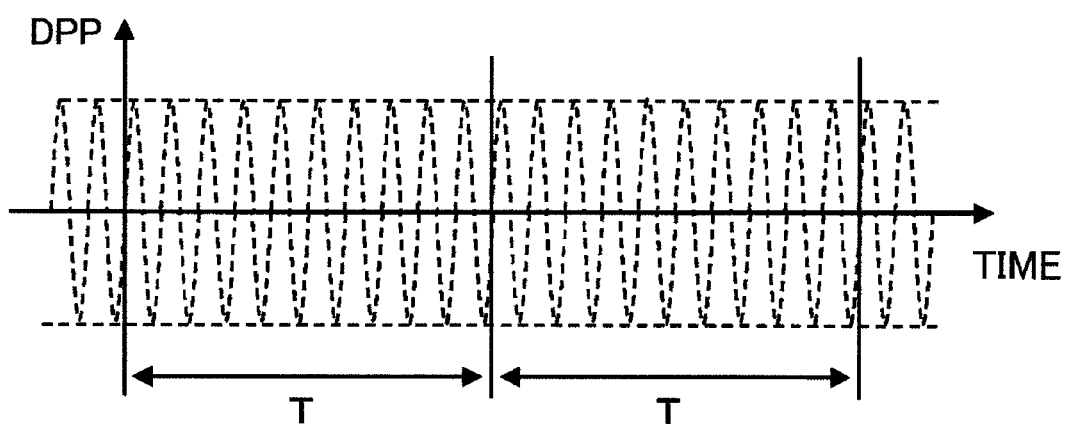
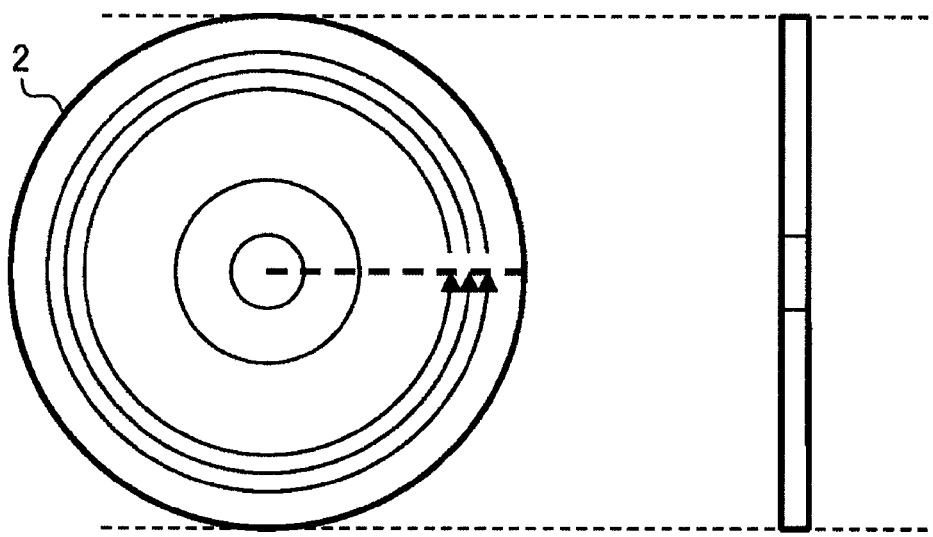

FIG. 6B
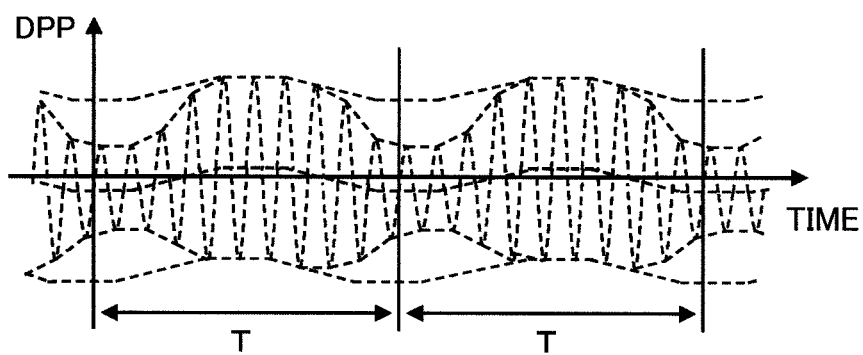
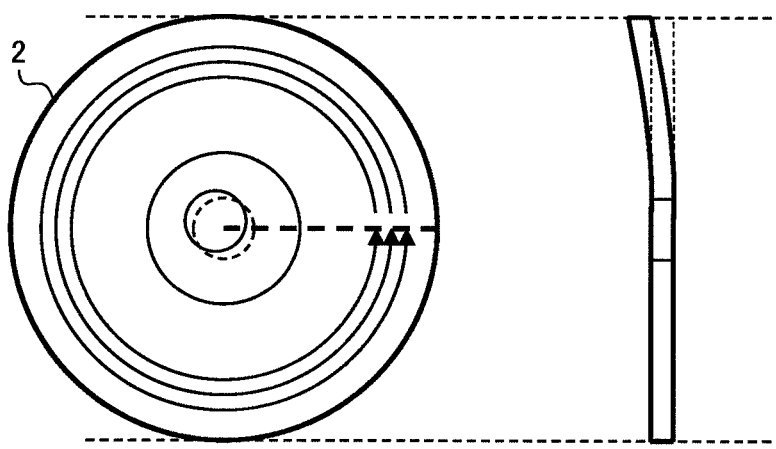

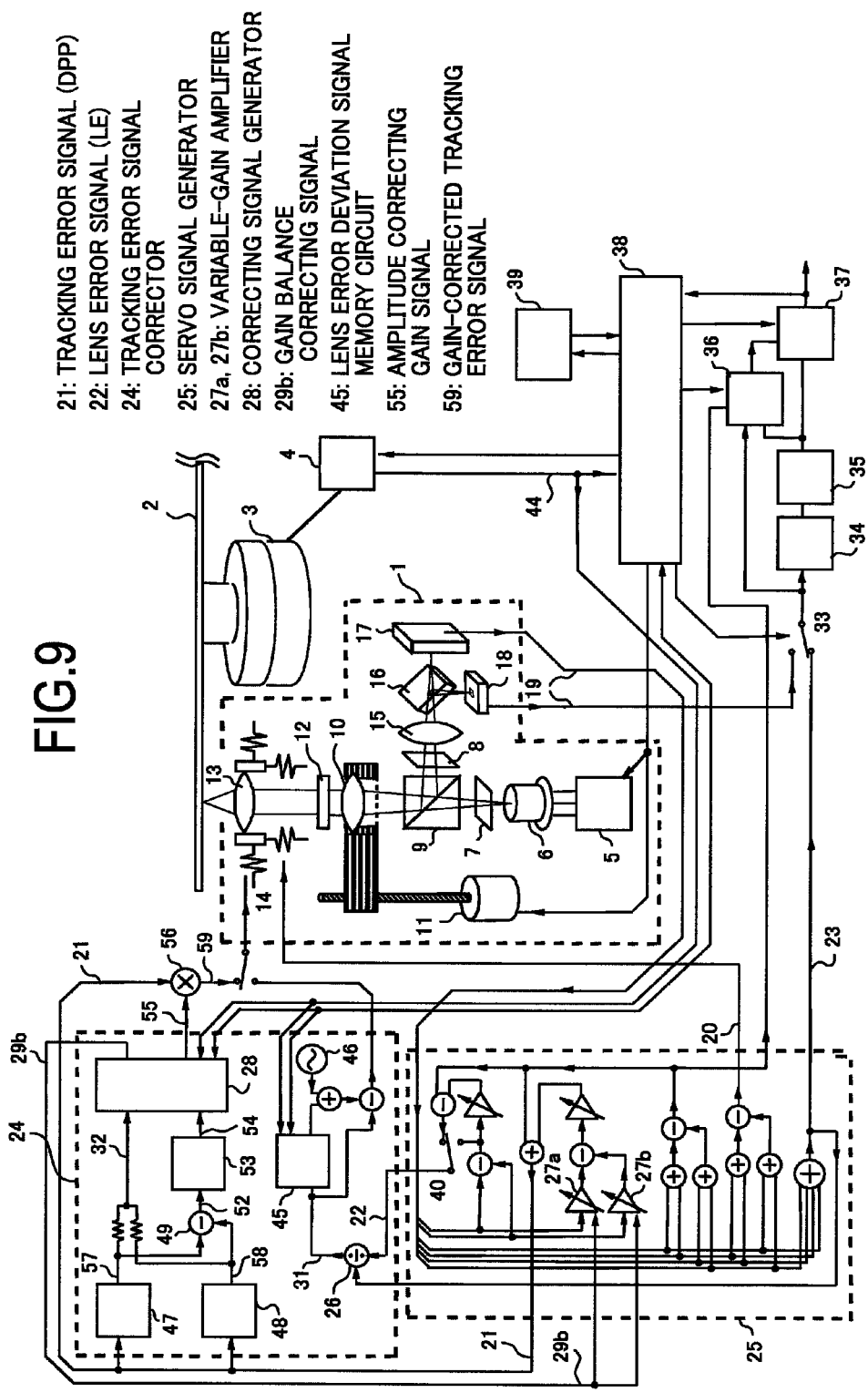

OPTICAL DISK APPARATUS

CLAIM OF PRIORITY

The present application claims priority from Japanese patent application serial no. JP 2011-164103, filed on Jul. 27, 2011, the content of which is hereby incorporated by reference into this application.

BACKGROUND OF THE INVENTION (1) Field of the Invention

The present invention relates to an optical disk apparatus that records information on or reads information out of an optical disk, and more particularly to an optical disk apparatus that highly accurately performs tracking control when recording or reading information in particular.

(2) Description of the Related Arts

The stability of tracking servo control is important for the reliability of an optical disk apparatus. The stability of tracking servo control is mainly determined by the stability of signals that the zero point of a tracking error signal is correctly matched with the center of a record information track under various use conditions, and a shift from the zero point is referred to as the offset of the tracking error signal.

Ideally, the offset of the tracking error signal is close to zero without limit (there is no shift). However, a shift occurs due to manufacture variations in a pickup that is an optical head and variations in media such as the eccentricity, warpage, and waviness of a disk to cause an offset. The zero point of a signal is sifted to disable correct servo control on the center of a track, causing a pickup to go out of a track in recording and reading a disk.

For measures to improve this problem, methods for correcting an offset that is a shift value in processing signals are described in Japanese Patent Application Laid-Open Publication No. 2006-294189 and Japanese Patent Application Laid-Open Publication No. 2011-065702.

In Japanese Patent Application Laid-Open Publication No. 2006-294189, an object is to highly accurately correct the offset of a tracking error signal even in the case where there are nonlinear characteristics such as a shift value between the position of an objective lens and the mechanical neutral position of the objective lens being not proportional to the offset value of the tracking error signal, and such a confutation is provided in which the shift value between the objective lens position and the mechanical neutral position of the objective lens is estimated and any one of a plurality of correcting functions is used according to the estimated shift value of the objective lens position to generate a correcting signal for the tracking error signal.

Moreover, in Japanese Patent Application Laid-Open Publication No. 2011-065702, an object is to correct the nonlinear offset of a tracking error signal, and there is disclosed that a drive circuit learns and corrects the non-linearity of the offset of a differential push-pull signal in association with a lens shift, in which the drive circuit measures an offset curve by learning and stores a correcting value, and in servo control, the correcting value is used to correct the tracking error signal for correcting a nonlinear component.

SUMMARY OF THE INVENTION

In the configuration of Japanese Patent Application Laid-Open Publication No. 2006-294189, problems arise in that a sufficient effect of correction is not obtained because of the influence of the vibration characteristics of an objective lens actuator itself and the costs of a corrector are increased. On the contrary, in Japanese Patent Application Laid-Open Publication No. 2011-065702, there is described that since the dual effect of correction is obtained at high speed from the combination of correction provided by pickup output signals and correction on the circuit side, correction on the circuit side itself is at low cost with low accuracy.

On the other hand, for another factor to determine the stability of tracking servo control, there is the stability of sensitivity in which the sensitivity of a shift value from the zero point of the tracking error signal is constant regardless of the eccentricity and warpage of a disk. The stability of sensitivity is exhibited in a constant amplitude of the tracking error signal. Ideally, the amplitude of the tracking error signal is always constant during one turn. However, the amplitude deviates because the objective lens moves in the radial direction in order to follow the eccentricity of a disk or the disk surface is tilted due to the warpage and waviness of a disk. When the amplitude deviates, feedback values in servo control become unstable to degrade the following performance in servo control, or a too much strong feedback oscillates the objective lens actuator. In Japanese Patent Application Laid-Open Publication No. 2006-294189 and Japanese Patent Application Laid-Open Publication No. 2011-065702, the amplitude deviation of the tracking error signal is not taken into account in particular.

In consideration of the forgoing problems, it is an object of the present invention to provide an optical disk apparatus that reliably corrects the offset of a tracking error signal and the amplitude deviation of a tracking error signal at low costs by processing signals.

The object can be achieved according to configurations described in the appended claims. For an example of the configurations, an optical disk apparatus includes an optical pickup and a signal processing circuit. The optical pickup includes: a light source; an objective lens configured to collect a laser beam emitted from the light source and apply the laser beam onto an optical disk; an actuator configured to drive the objective lens; and a photodetector configured to detect reflected light from the optical disk and output a photodetected signal. The signal processing circuit includes: a servo signal generator configured to generate a tracking error signal and a lens error signal from the photodetected signal outputted from the photodetector; a lens error deviation signal memory circuit configured to store the lens error signal generated at the servo signal generator and reproduce a deviation of the lens error signal; and a tracking error signal corrector configured to receive the tracking error signal and learn and generate an amplitude correcting value that corrects an amplitude deviation of the tracking error signal. The amplitude correcting value for the tracking error signal learned at the tracking error signal corrector is acquired from a tracking error signal detected in reproducing the deviation of the lens error signal.

According to the present invention, it is possible to provide an optical disk apparatus that reliably corrects the offset of a tracking error signal and the amplitude deviation of a tracking error signal at low costs by processing signals.

BRIEF DESCRIPTION OF THE DRAWINGS

The present invention will become fully understood from the detailed description given hereinafter and the accompanying drawings, wherein:

FIGS. 6A and 6B are diagrams illustrating the case of learning a DPP signal in the rotating direction of a disk;

FIG. 9 is a diagram illustrating the overall configuration of a second embodiment of the optical disk apparatus according to the present invention;

DETAILED DESCRIPTION OF THE EMBODIMENT

Figure 1:
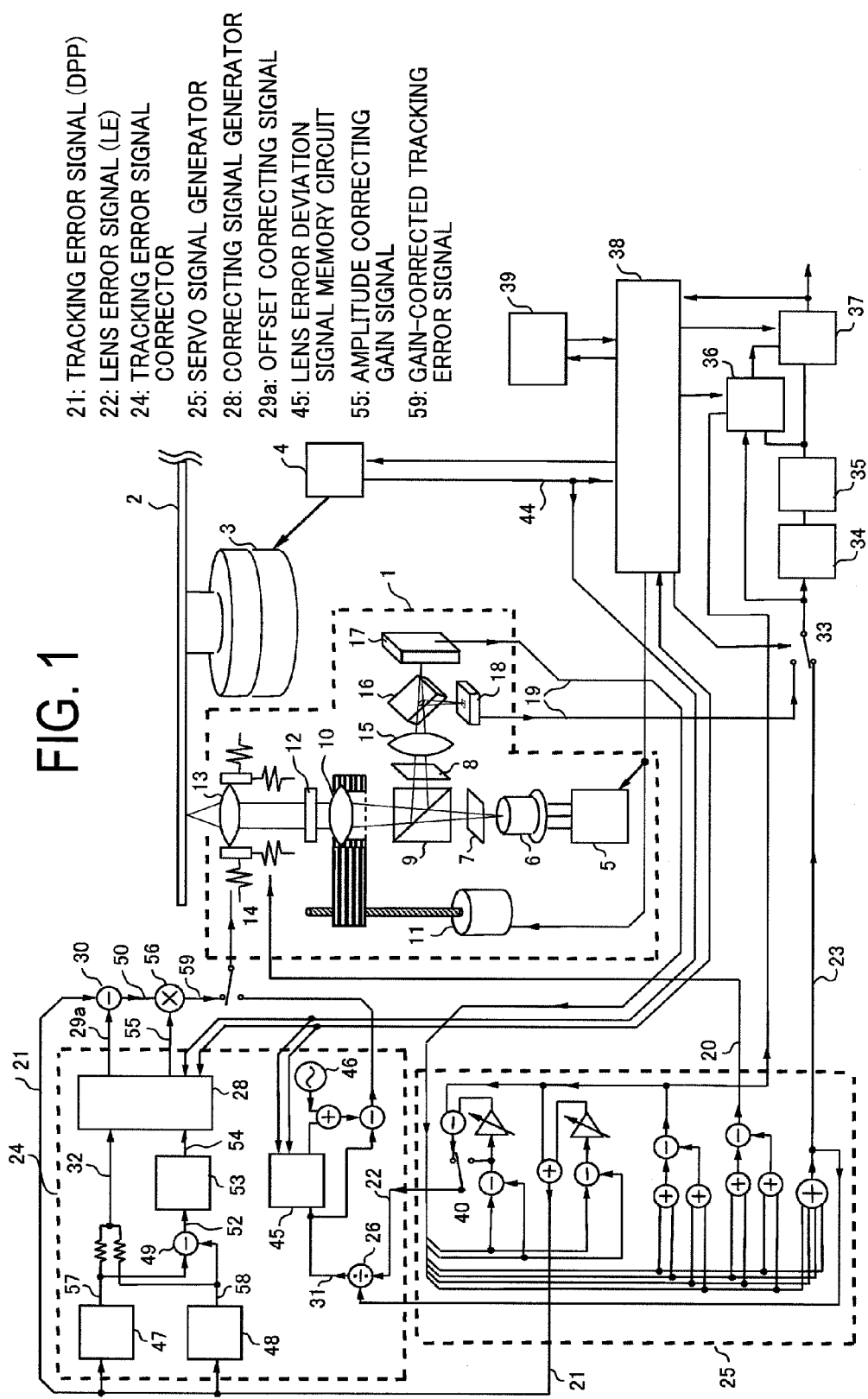
FIG. 1 is a diagram illustrating the overall configuration of a first embodiment of an optical disk apparatus according to the present invention.

In the following, embodiments of an optical disk apparatus according to the present invention will be described. The optical disk apparatus according to the present invention corrects the offset of a tracking error signal as well as the deviation of the sensitivity (the signal amplitude) of a tracking error signal to allow highly accurate tracking servo control. To this end, the offset of the tracking error signal is simply and reliably corrected on the circuit side using only a few tens bytes of learning information on the LSI side, making use of the characteristics of a pickup output signal. Moreover, the deviation of the sensitivity (the amplitude deviation) of a tracking error signal in a disk rotation period is also corrected. The configuration of the optical disk apparatus can be implemented by the combination of an optical pickup with signal output meeting correction and a signal processing circuit having a correction functionality. Furthermore, the signal processing circuit is incorporated in a single integrated circuit chip having functionalities of decoding and error correction to implement a reduction in costs, more sophisticated functionalities, and high reliability. In the following description, portions having the same operations are designated the same reference numerals and signs in the drawings for easy understanding.

First, a conventional method for processing a tracking error signal will be described. In the optical disk apparatus, in order to correctly follow a track even in the case where a disk is decentered, a differential push-pull method is adopted to correct a lens center shift (a lens shift: LS) that occurs on a tracking error signal used for servo control due to eccentricity.

Figure 10A:
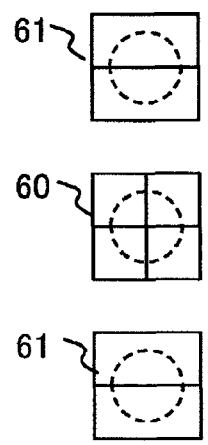
FIGS. 10A and 10B are diagrams illustrative of a differential push-pull method in the case of a three-beam method.
Figure 10B:
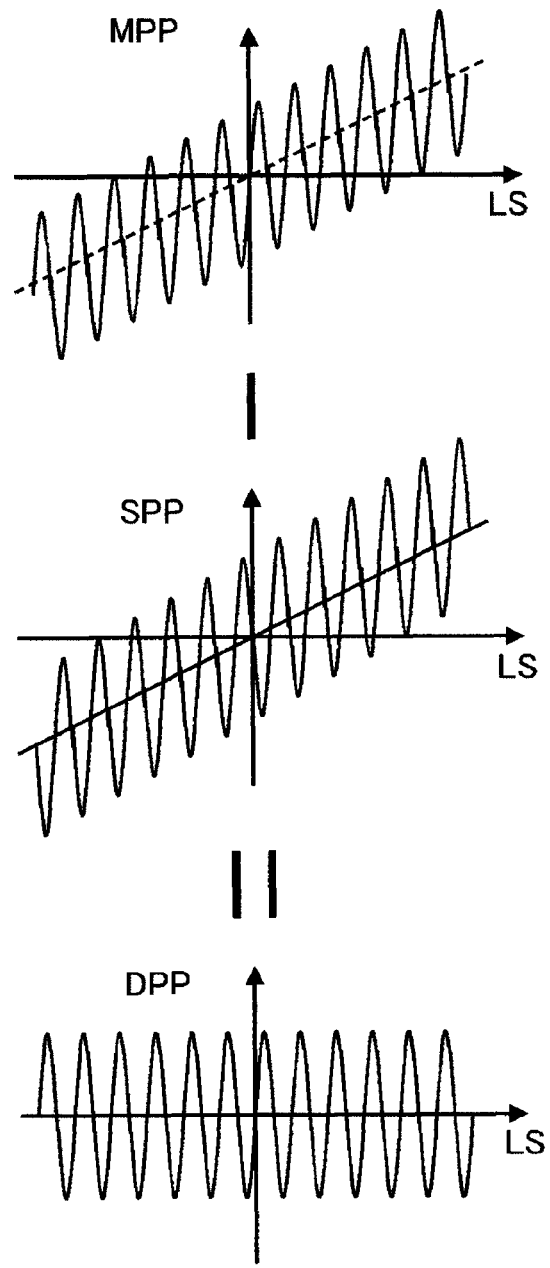

FIGS. 10A and 10B are diagrams illustrative of a differential push-pull method in the case of a three-beam method. As illustrated in FIG. 10A, two sub-spot detector planes 61 are disposed on both sides of a main-spot detector plane 60. Then, a difference between a push-pull signal (a main push-pull signal: MPP) detected on the main-spot detector plane 60 and a push-pull signal (a sub push-pull signal: SPP) detected on the sub-spot detector plane 61 is found to cancel and correct vertical deviation (an offset) included in the MPP signal. That is the differential push-pull (DPP) method. The push-pull signal corrected by the differential push-pull method is referred to as a differential push-pull (DPP) signal. Generally, since the MPP signal and the SPP signal exhibit similar vertical deviation with respect to a lens shift, the vertical deviation (the offset) of the DPP signal in association with a lens shift is eliminated in a correctly adjusted differential push-pull signal as illustrated in FIG. 10B.

Figure 11A:
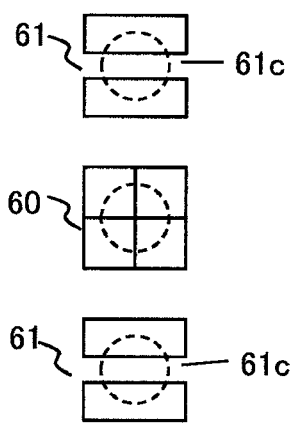
FIGS. 11A and 11B are diagrams illustrative of the case where the shape of a detector plane according to the three-beam method is changed.
Figure 11B:
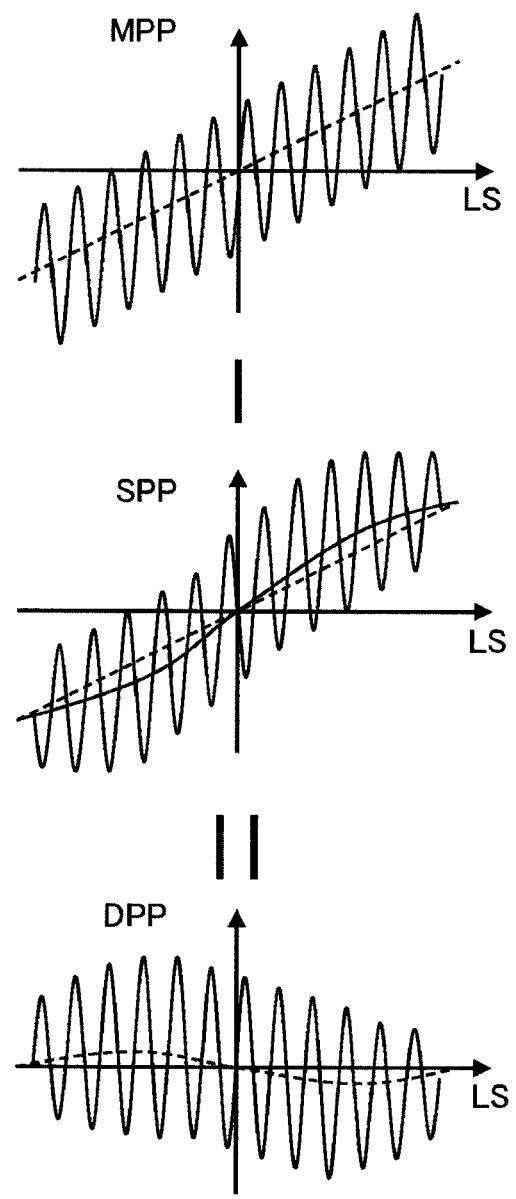

FIGS. 11A and 11B are diagrams illustrative of the case where the shape of a detector plane according to the three-beam method is changed. In this example, for measures against stray light in a multi-layer optical disk with two or three recording layers or more in these years, such a shape is provided as illustrated in FIG. 11A in which a center part 61c between sub-spot detector planes 61 is omitted. In that case, since the shape of the main spot detector plane 60 is different from the shape of the sub-spot detector plane 61, in the case where a spot deviates due to a lens shift, unbalance occurs between the MPP signal and the SPP signal as illustrated in FIG. 11B. A nonlinear offset occurs on the SPP signal side in association with a lens shift particularly, and the amplitude is also changed. Thus, a nonlinear offset with respect to a lens shift occurs in the DPP signal that is obtained from a difference between the MPP signal and the SPP signal. Moreover, the sensitivity of feedback is changed in association with amplitude deviation, causing unstable tracking servo control for the possibility that a pickup goes out of a track.

Figure 12A:
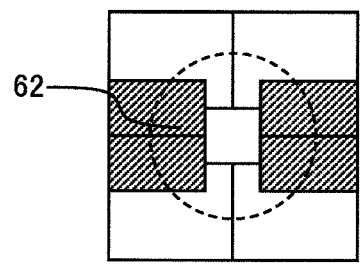
FIGS. 12A to 12C are diagrams illustrative of a method for generating a tracking error signal according to a single beam method.
Figure 12B:
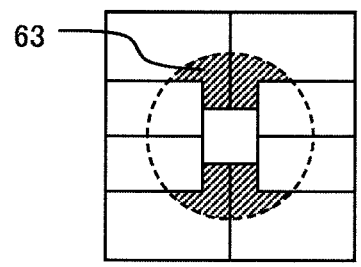
Figure 12C:
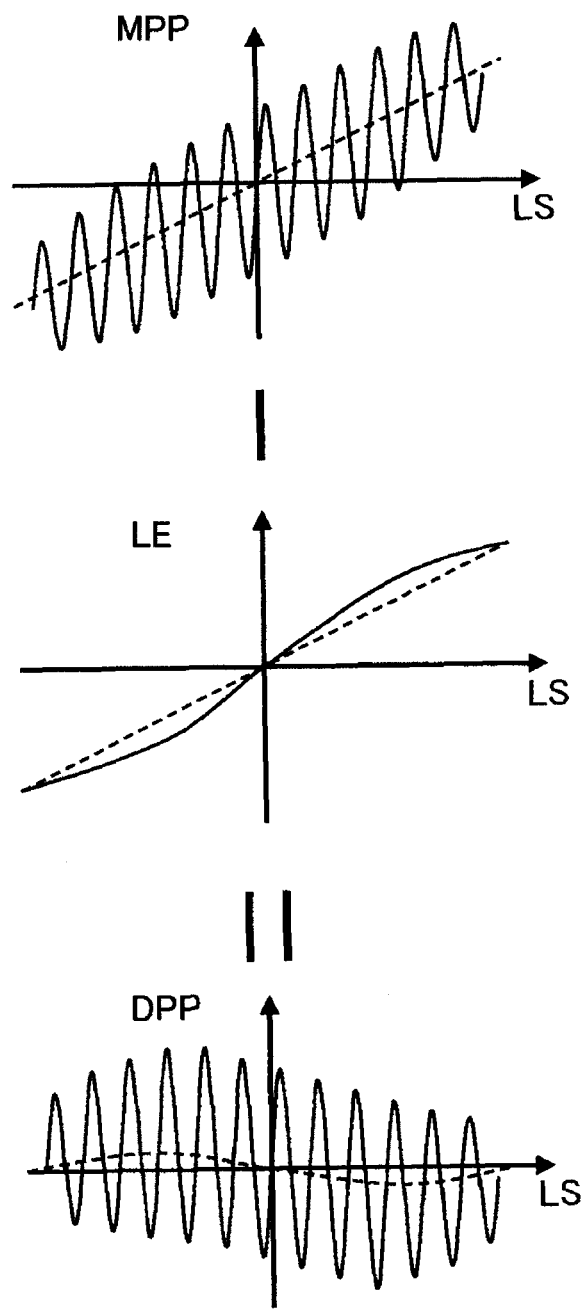

Similar problems also occur in a method for generating a tracking error signal according to a single beam method illustrated in FIGS. 12A to 12C. FIGS. 12A and 12B are examples of diffraction grating patterns used for the single beam method. For a lens shift, a signal corresponding to the MPP signal is generated in hatched portions 62 in FIG. 12A, and a signal corresponding to the SPP signal is generated in hatched portions 63 in FIG. 12B. It is noted that the signal obtained from the hatched portions 63 is referred to as a lens error signal (a LE signal). Since the pattern shapes are different between FIGS. 12A and 12B, a nonlinear offset occurs in the DPP signal with respect to a large lens shift as illustrated in FIG. 12C, and the amplitude is also changed. It is noted that this nonlinear offset is referred to as a nonlinear offset and a linear change of the offset is referred to as a linear offset. Moreover, a change in the amplitude of a push-pull signal (a PP signal) is referred to as amplitude deviation.

Typically, in the case where a disk medium is decentered or a disk medium has warpage or a partial deformation (in FIG. 6B, described later), the balance of reflected light is disturbed to cause periodical offset deviation (a nonlinear offset) or periodical amplitude deviation in synchronization with a disk rotation period. The optical disk apparatus according to the embodiment simultaneously corrects the periodical offset deviation and the amplitude deviation.

[First Embodiment]

FIG. 1 is a diagram illustrating the overall configuration of a first embodiment of an optical disk apparatus according to the present invention. In the overall configuration of the apparatus, the apparatus includes an optical pickup part 1 that applies a laser beam onto an optical disk 2 to record and read data, a mechanism part including a spindle motor 3 on which the optical disk 2 is mounted for rotation, and a signal processing circuit part other than these components. A spindle motor controller 4 controls the rotation speed of the spindle motor 3. As for processing a tracking error signal in the signal processing circuit part, a servo signal generator 25 and a tracking error signal corrector 24 are provided. In this embodiment, an explanation is given as the three-beam method is taken as an example. However, the present invention is not limited thereto, and the present invention is also applicable to the single beam method. In the following, the configuration and operation of the components will be described.

In the optical pickup part 1, a semiconductor laser 6 that is a light source is driven by a laser driver 5, and emits a laser beam. The beam of the semiconductor laser 6 passes through a diffraction grating 7 for the three-beam method, and the beam is split into three beams. It is noted that this diffraction grating 7 is not provided in the case of the single beam method, and a diffraction grating 8 is provided on the return path side instead of the diffraction grating 7. The beam that has passed through the diffraction grating 7 passes through a beam splitter 9, and goes to a collimator 10 as it is. The collimator 10 is held on the movable part of a lens driving mechanism, and the movable part is configured so as to be movable in the direction parallel with the optical axis by a stepping motor 11. The beam that has passed through the collimator 10 passes through a quarter-wave plate 12, and the beam is collected at an objective lens 13, and applied onto the optical disk 2 that is a recording medium. The objective lens 13 is mounted on an actuator 14, in which the focal point can be driven in a focus direction and a track direction according to signals from the servo signal generator 25.

The applied beam is reflected at the disk 2, and the beam again passes through the objective lens 13, the quarter-wave plate 12, and the collimator 10, and then enters the polarization beam splitter 9. In this process, the polarization of the light beam is rotated at an angle of 90 degrees because the light beam passes through the quarter-wave plate 12 twice, so that the light beam is reflected at the polarization beam splitter 9 (in the case of the single beam method, the light beam passes through the diffraction grating 8 here), and goes to a detection lens 15. The beam that has passed through the detection lens 15 passes through a half mirror 16, and the beam is detected on a detection plane on a photodetector 17, and converted into an electric signal. It is noted that in order to improve the signal-to-noise ratio of a readout signal, the half mirror 16 is inserted between the detection lens 15 and the photodetector 17, and a readout-signal photodetector 18 with a high signal-to-noise ratio is also provided. The electric signal converted on the photodetector 17 is amplified at a photocurrent amplifier in the photodetector, and a photodetected signal 19 is outputted.

The servo signal generator 25 generates a focusing error signal 20, a tracking error signal (a DPP signal) 21, a lens error signal (an LE signal) 22, and a readout signal (an RF signal) 23 from the photodetected signal 19 outputted from the optical pickup 1. The tracking error signal 21 is calculated according to the differential push-pull method described in FIGS. 10A and 10B and FIGS. 11A and 11B. It is noted that a quadrant photodetector meeting the three-beam method is used for the photodetector 17 according to this embodiment, in which focus error signals are detected according to the astigmatism method. Moreover, in the case of the single beam method, focusing error signals are detected according to the knife edge method. A selector 40 selects a method between the three-beam method and the single beam method. In those drawings, the three-beam method is selected.

A tracking error signal corrector 24 generates a tracking error signal offset correcting signal (in the following, referred to as an offset correcting signal) 29a and a tracking error signal amplitude correcting gain signal (in the following, referred to as an amplitude correcting gain signal) 55 from the tracking error signal (the DPP signal) 21, the lens error signal (the LE signal) 22, and the readout signal (the RF signal) 23 outputted from the servo signal generator 25, and outputs the offset correcting signal 29a and the amplitude correcting gain signal 55.

In the tracking error signal corrector 24, first, a deviator 26 is used to generate a lens error signal (a corrected LE signal) 31 corrected with the sum total of photodetected signal output from the lens error signal 22 and the readout signal 23. This aims to provide highly accurate correction by preventing the detection of a faulty lens shift value due to variations in a total readout light quantity. This corrected lens error signal 31 is inputted to a lens error deviation signal memory circuit 45 to store the deviation of the lens error signal for learning the deviation of the lens shift position. Moreover, the corrected lens error signal 31 is compared with a stored value read out of the lens error deviation signal memory circuit 45 to control the lens shift position as matched with disk rotation so as to reproduce the stored deviation of the lens error signal. In this control, a wobble signal generator 46 provides slight vibrations from the lens shift position. Thus, the amplitude of the tracking error signal 21 can be reliably detected at the individual lens shift positions.

Furthermore, the tracking error signal corrector 24 receives the tracking error signal (the DPP signal) 21 in learning the deviation of the lens shift position or while tracking servo control is off, a peak maximum value detector 47 generates a top envelope signal 57, and a peak minimum value detector 48 generates a bottom envelope signal 58. A mean value between the generated top envelope signal 57 and the generated bottom envelope signal 58 is found to generate a DPP offset signal 32. Moreover, a difference between the top envelope signal 57 and the bottom envelope signal 58 is found at a subtractor 49 to generate a DPP amplitude signal 52. Furthermore, an inverse signal generator 53 founds the reciprocal of the DPP amplitude signal 52 to generate a DPP amplitude correcting gain signal 54.

A correcting signal generator 28 stores the DPP offset signal 32 and the DPP amplitude correcting gain signal 54, which are correcting values, in synchronization with disk rotation according to a spindle rotation clock 44 outputted from the spindle motor controller 4. The correcting values are read out of the correcting signal generator 28 in synchronization with disk rotation to interpolate values in clock intervals, and the offset correcting signal 29a and the amplitude correcting gain signal 55 are outputted. A subtractor 30 adds the offset correcting signal 29a to or subtracts the offset correcting signal 29a from the tracking error signal 21 for correction, and then generates an offset gain-corrected tracking error signal 50. Moreover, a multiplier 56 multiplies the amplitude correcting gain signal 55 by the tracking error signal 50 to generate a gain-corrected tracking error signal 59. The multiplier 56 then supplies the gain-corrected tracking error signal 59 to the optical pickup 1 to drive the actuator 14.

It is noted that the inverse signal generator 53 has a clipping functionality to restrict the maximum value within a certain value as were as to find the reciprocal value. Thus, the gain (=the reciprocal value) can be prevented from becoming too large, and oscillation can be suppressed in servo control.

Moreover, the peak maximum value detector 47 and the peak minimum value detector 48 detect the top envelope signal 57 and the bottom envelope signal 58 to detect the offset signal 32 and the amplitude signal 52 of the DPP signal at the same time. The DPP offset signal 32 and the DPP amplitude signal 52 are detected at the same time to allow consistent, proper correction also in correction.

On the other hand, after a selector 33 selects any one of the readout signal (the RF signal) 23 read out of the disk 2 and the output of the readout-signal photodetector 18, the signal or output passes through an equalizer 34, a level detector 35, and a synchronous clock generator 36, and then the signal or output is converted into an original recorded digital signal at a decoder 37. Moreover, the synchronous clock generator 36 directly detects a combined readout signal at the same time to generate a synchronization signal, and supplies the synchronization signal to the decoder 37. A main controller 38 controls a series of these circuits in a centralized manner. It is noted that this configuration includes a nonvolatile memory 39, in which the initial parameters of the optical pickup necessary for correction are held even after a power supply is turned off and the previous learning content is used to accelerate the initial operations.

Next, the configuration and operation of the correcting signal generator 28 will be described in detail.

Figure 2:
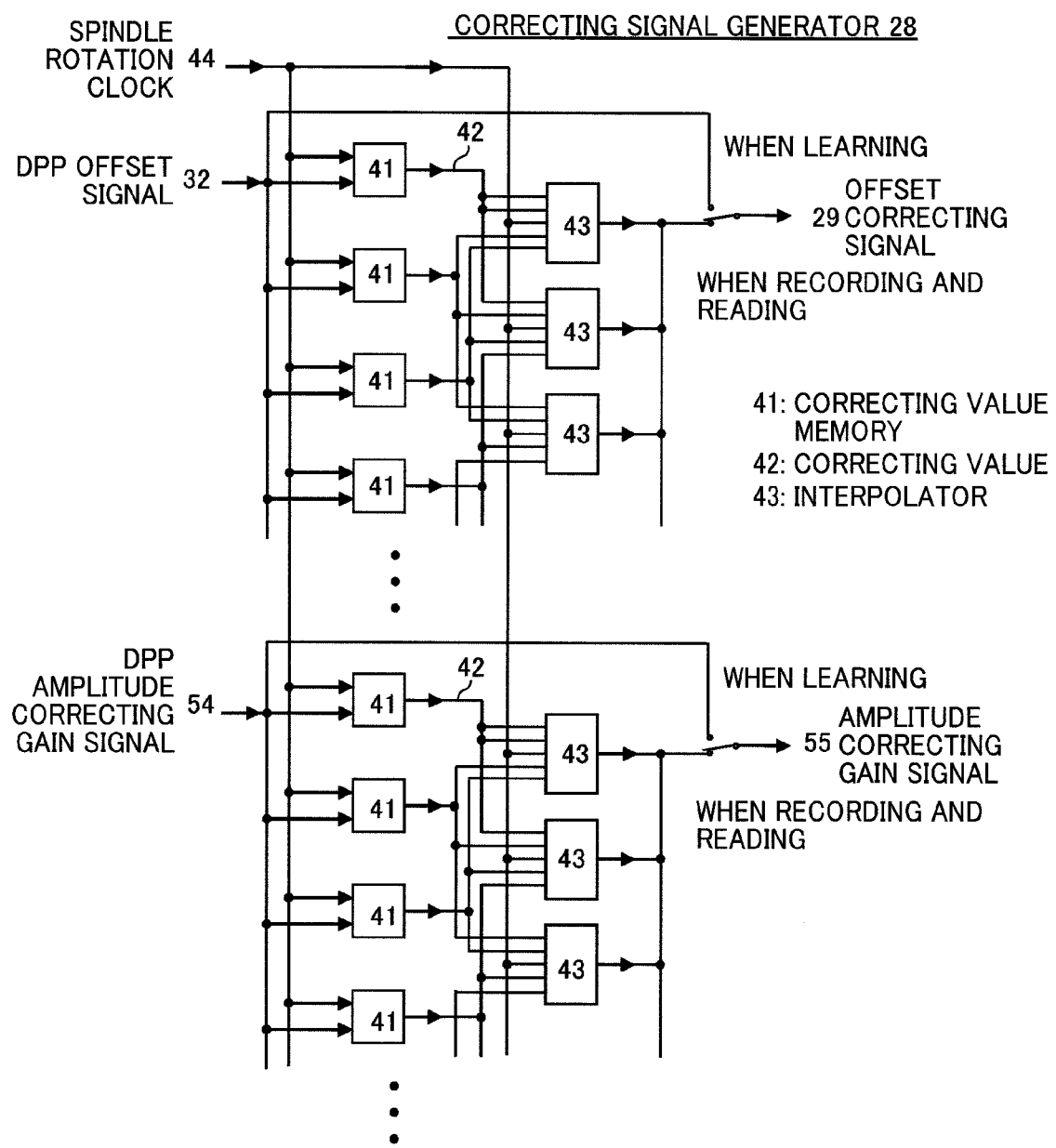
FIG. 2 is a block diagram illustrating the detail of a correcting signal generator.

FIG. 2 is a block diagram illustrating the detail of the correcting signal generator 28. The correcting signal generator 28 receives and stores the offset value and amplitude of the tracking error signal, and performs an interpolation process according to a disk rotation angle (the spindle rotation clock 44 here). The disk rotation angle is divided into a plurality of sections, and a plurality of correcting value memories 41 are provided corresponding to the sections. The correcting value memories 41 store a representative value in the intervals of the inputted DPP offset signal 32 and the inputted DPP amplitude correcting gain signal 54 in learning while focus servo control is on and tracking servo control is off.

Correcting values 42 read out of the correcting value memories 41 are outputted to a plurality of interpolators 43. The interpolators 43 are also provided corresponding to the sections of the disk rotation angle. The interpolator 43 corresponding to the section, from which a correcting value is outputted according to the disk rotation angle, uses the correcting values 42 read out of four neighboring sections including the corresponding section, for example, to perform the interpolation process. The interpolator 43 then outputs the interpolated offset correcting signal 29a (or a gain balance correcting signal 29b, described later) and the interpolated amplitude correcting gain signal 55. Thus, the correcting signal generator 28 outputs an interpolation waveform where the points of the stored correcting values are smoothly connected.

It is noted that in this embodiment, this amplitude correcting gain signal 55 is also referred to as a tracking amplitude correcting signal. Moreover, the interpolated offset correcting signal 29a (or the gain balance correcting signal 29b) and the interpolated amplitude correcting gain signal 55 are together referred to as a tracking error signal correcting signal.

Figure 3:
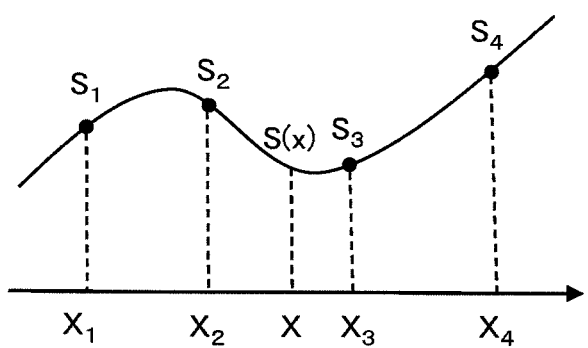
FIG. 3 is a diagram illustrating the internal operation of an interpolator.

FIG. 3 is a diagram illustrating the internal operation of the interpolator 43. The interpolation process is performed by spline interpolation, in which a smooth cubic function as illustrated in FIG. 3 is used to approximate correcting values at given rotation angles x, where the disk rotation angle is x, and the stored correcting value 42 is S.

This cubic function is determined as follows. First, in the learning stage, coefficients (spline interpolation coefficients) a, b, c, and d of a cubic function used for the sections are found using Equation 1. Subsequently, the coefficients are substituted into Equation 2 to determine the cubic function for calculating the interpolation process.

$$\begin{pmatrix} a \\ b \\ c \\ d \end{pmatrix} = \begin{pmatrix} X_1^3 & X_1^2 & X_1 & 1 \\ X_2^3 & X_2^2 & X_2 & 1 \\ X_3^3 & X_3^2 & X_3 & 1 \\ X_4^3 & X_4^2 & X_4 & 1 \end{pmatrix}^{-1} \begin{pmatrix} S_1 \\ S_2 \\ S_3 \\ S_4 \end{pmatrix}$$ Equation 1

$$S(X) = ax^3 + bx^2 + cx + d$$ Equation 2

Since timing to learn the correcting value for the tracking error signal is limited to time when the amplitude of the push-pull signal is obtained, the timing is limited to a period while focus servo control is on and tracking servo control is off, and values corresponding to the disk rotation angles (the spindle rotation clock 44 here) are stored. Alternatively, this learning can also be performed beforehand when the optical disk apparatus is shipped. Learning is also performed in the radial direction to perform highly accurate correction meeting variations in media.

Figure 4:
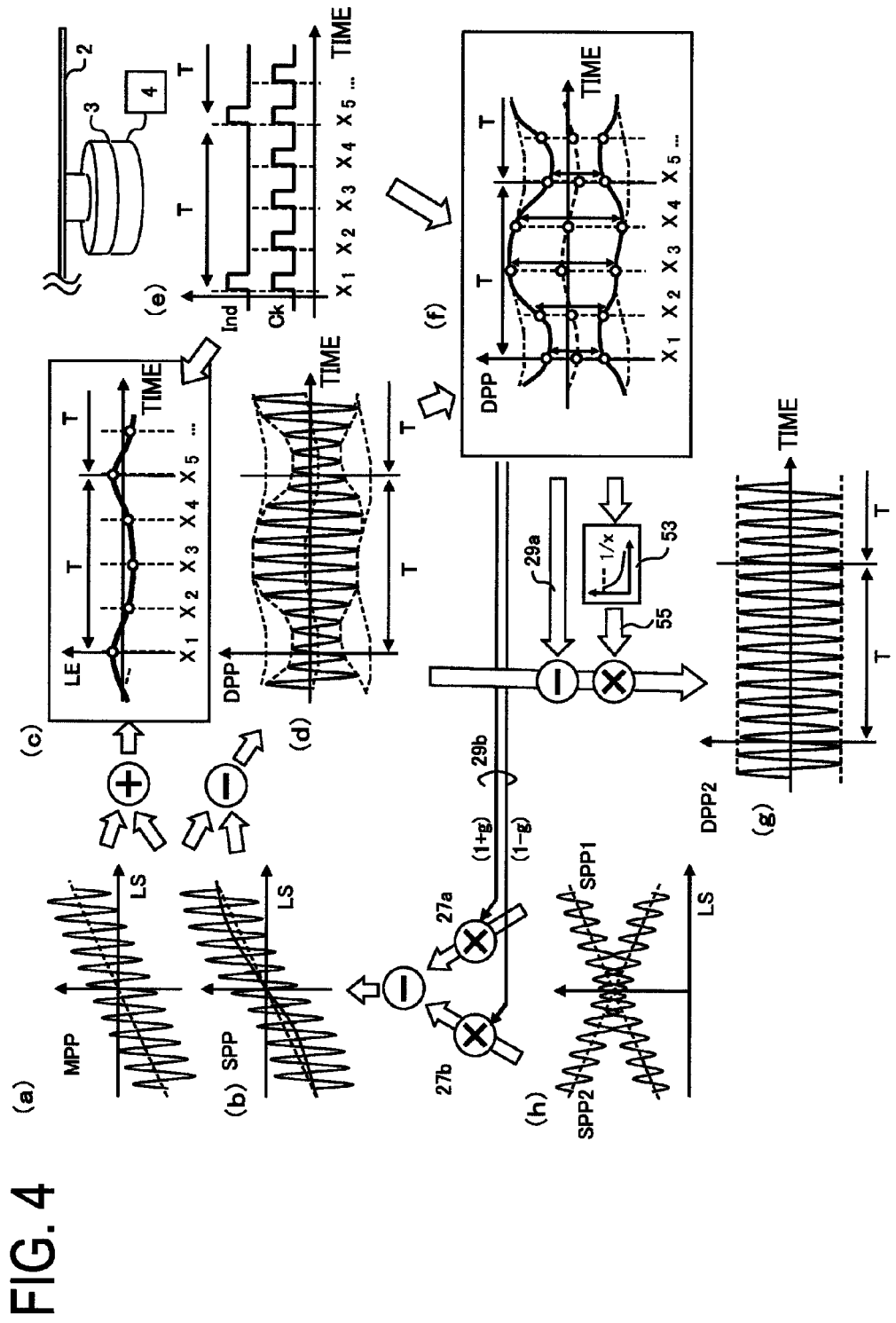
FIG. 4 is a diagram illustrating the principle of correcting a tracking error signal according to the first embodiment.

FIG. 4 is a diagram illustrating the principle of correcting the tracking error signal according to this embodiment. In the general DPP method, a DPP signal (d) and an LE signal (c) are generated from an MPP signal (a) and an SPP signal (b). In this configuration, the envelopes of the amplitude of the tracking error signal in one turn of the disk are detected to learn and store amplitude deviation that occurs in the DPP signal (the tracking error signal) in synchronization with disk rotation and a remaining nonlinear offset value while tracking servo control is off. After learning and storage, in the recording operation or the readout operation after tracking servo control is turned on, the amplitude correcting gain and nonlinear offset correcting value of the DPP signal are generated while performing spline interpolation based on information about the learned amplitude deviation and the learned remaining nonlinear offset value, and the amplitude deviation and offset deviation of the DPP signal are corrected.

First, a lens error signal LE (c) corresponding to the lens shift signal is generated, a lens error signal deviation storing and reproducing unit (the lens error deviation signal memory circuit 45) that receives the lens error signal is used to drive the objective lens 13 in the radial direction while tracking servo control is off, and servo control is performed so as to reproduce the lens error signal deviation (the lens shift value) (c) stored when learning.

The offset and amplitude deviation of the tracking error signal corresponding to disk rotation angles (e) are learned in servo-controlling the lens error signal deviation (c), and the offset and the amplitude deviation are stored as correcting values (f) for the tracking error signal.

In the recording and readout operations, a disk rotation angle detection signal (e) is inputted, and the offset correcting signal 29a and the amplitude correcting gain signal 55 for the tracking error signal corresponding to the disk rotation angle are generated to correct a DPP signal to be measured. As a result of correction, a tracking error signal (DPP2) (g) after correcting the offset and the gain is generated.

It is noted that here, an accurate lens shift value (LS) is unknown in this circuit, and a lens error signal (LE) including distortion is used when learning instead of the lens shift value. Moreover, the differential push-pull signal (the DPP signal) is considered as a general tracking error signal. However, in some cases, a signal that a lens shift signal corresponding to a lens shift is subtracted from an MPP signal is referred to as a DPP signal in the single beam method for convenience. Here, a signal that can be used for a tracking error signal is referred to as a DPP signal also in the cases of the three-beam method and the single beam method.

Figure 5:
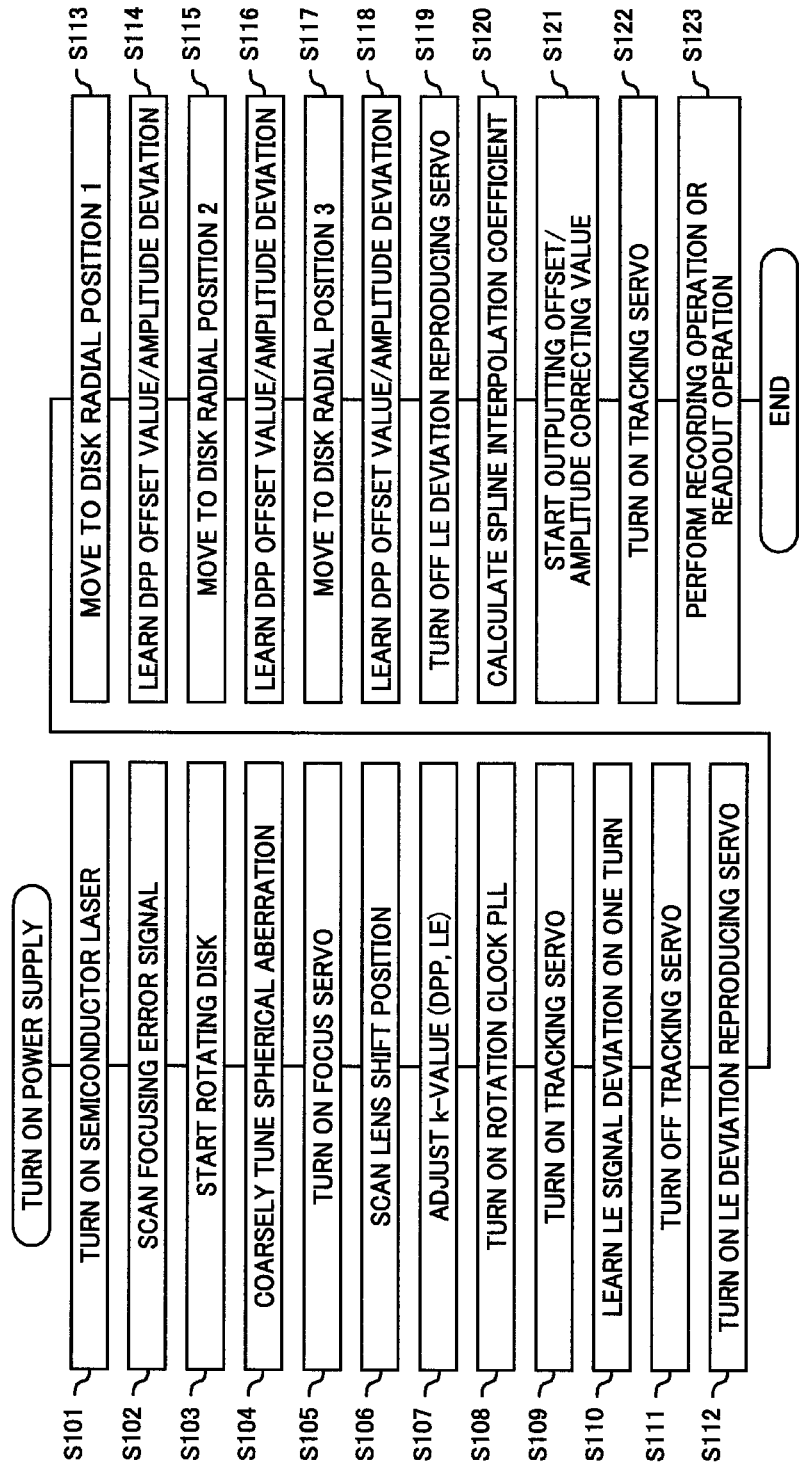
FIG. 5 is a flowchart illustrating the procedures of setting tracking control.

FIG. 5 is a flowchart illustrating the procedures of setting tracking control.

For the preparation steps, the semiconductor laser is lit (S101), the focusing error signal is scanned by vertically moving the lens (lens swing) (S102), and the type of a disk is determined. Subsequently, the disk is started to rotate (S103), and the position of the collimator is moved to coarsely tune a spherical aberration (S104). Subsequently, focus servo control is turned on (S105). Since a DPP signal can be detected at this point in time, the lens is shifted (S106), and the gains of two variable-gain amplifiers in the servo signal generator 25 are adjusted to adjust a k-value in a so-called differential push-pull method (kDPP and kLE are learned) (S107). Thus, a linear offset for the lens error signal in the DPP signal is corrected, and only a nonlinear offset remains. Subsequently, a phase lock circuit (PLL) is turned on as matched with a disk index signal Idx and a spindle rotation clock Ck in synchronization with a disk rotation period T (S108).

First, for learning in the first stage, tracking servo control is turned on in an unlearned state (S109), and the one-turn deviation of the lens error signal (LE) is learned. That information is stored in the lens error deviation signal memory circuit 45 in synchronization with disk rotation (S110). Subsequently, tracking servo control is turned off (S111), and a lens shift value is servo-controlled so as to reproduce the one-turn deviation of the lens error signal (LE) learned previously (S112).

In the LE deviation reproducing servo control in Step S112, the deviation value of the lens error signal (LE) stored in Step S110 is read out of the lens error deviation signal memory circuit 45 in synchronization with disk rotation, a differential signal is amplified and applied to the actuator 14, and the objective lens 13 is driven so as to match with the stored deviation of the lens error signal. As a result, the trace of the lens shift value the same as the trace of the lens shift value while tracking servo control is on is reproduced while tracking servo control is off in synchronization with disk rotation. Here, the servo control of the lens shift is referred to as LE deviation reproducing servo control.

Subsequently, for learning in the second stage, the pickup 1 is moved to a predetermined radial position 1 on the disk 2 in a state in which LE deviation reproducing servo control is on (S113). The top envelope signal 57 and the bottom envelope signal 58 of the tracking error signal 21 are then detected to measure the deviations of the offset value and amplitude (and the amplitude correcting gain) of the DPP signal. The deviations of the measured offset value and the measured amplitude correcting gain are stored in the correcting signal generator 28 in synchronization with the spindle rotation clock Ck (the disk rotation angle position) (S114). Thus, the one-turn deviations of the nonlinear offset and the amplitude to be corrected are learned.

In the learning in the second stage, a few disk radial positions are changed to learn the correcting values for the offset and the amplitude at the radial positions (S115 to S118). More specifically, the DPP offset value and the amplitude are detected in one turn of the disk at the disk radial positions, and the correcting values for the DPP offset value and the amplitude are stored. Upon the completion of learning, LE deviation reproducing servo control is turned off (S119). The spline interpolation coefficients in Equations 1 and 2 are then calculated from a plurality of stored correcting values for the DPP offset value and the amplitude (S120).

After finishing the learning in the second stage, the offset correcting signal 29a and the amplitude correcting gain signal 55 are started to be outputted (S121). Namely, the correcting signal generator 28 performs the spline interpolation process in synchronization with the spindle rotation clock Ck based on the learned correcting values, and supplies the offset correcting signal 29a and the amplitude correcting gain signal 55 to the subtractor 30 and the multiplier 56. Tracking servo control is turned on (S122), and the recording operation or the readout operation is started (S123). As described above, tracking servo control is performed while correcting the nonlinear offset and amplitude deviation of the tracking error signal.

According to the tracking servo control described above, since the amplification factor of the signal from the tracking error signal to the actuator 14 is changed, a tracking servo control loop gain on the circuits seems to change in synchronization with disk rotation in the overall servo control loop.

Specific examples of the learning operation according to this embodiment will be described with reference to the drawings.

FIGS. 6A and 6B are diagrams illustrating the case of learning a DPP signal in the rotating direction of a disk. Even in a disk with irregularity along the rotation direction, the one-turn deviation is grasped with excellent reproducibility to allow stable learning of the correcting values. FIG. 6A illustrates an ideal waveform for the DPP signal, in which the amplitude is constant on disk rotation without vertical deviation (offset deviation). FIG. 6B illustrates an exemplary DPP signal actually obtained, in which both of the amplitude and the offset deviate due to the eccentricity and warpage of an optical disk. Even though the k-value is correctly adjusted, the DPP signal sometimes vertically deviates on the time axis in the rotation period T due to the influence of the warpage or the like of a disk. Therefore, the deviation caused by factors other than the pickup is learned in synchronization with disk rotation to stabilize the learning of the correcting values.

Alternatively, learning is performed on a unit of one turn of the spindle to grasp the deviation in the entire one turn of the disk at the fastest speed with no deviation of the angle for stably learning the correcting values. In adjusting the k-value (kDPP and kLE), a time average in one turn is found to stabilize the learning of the correcting values. Also in finding the average of a plurality of learning results, the stability of the mean value is increased.

Figure 7:
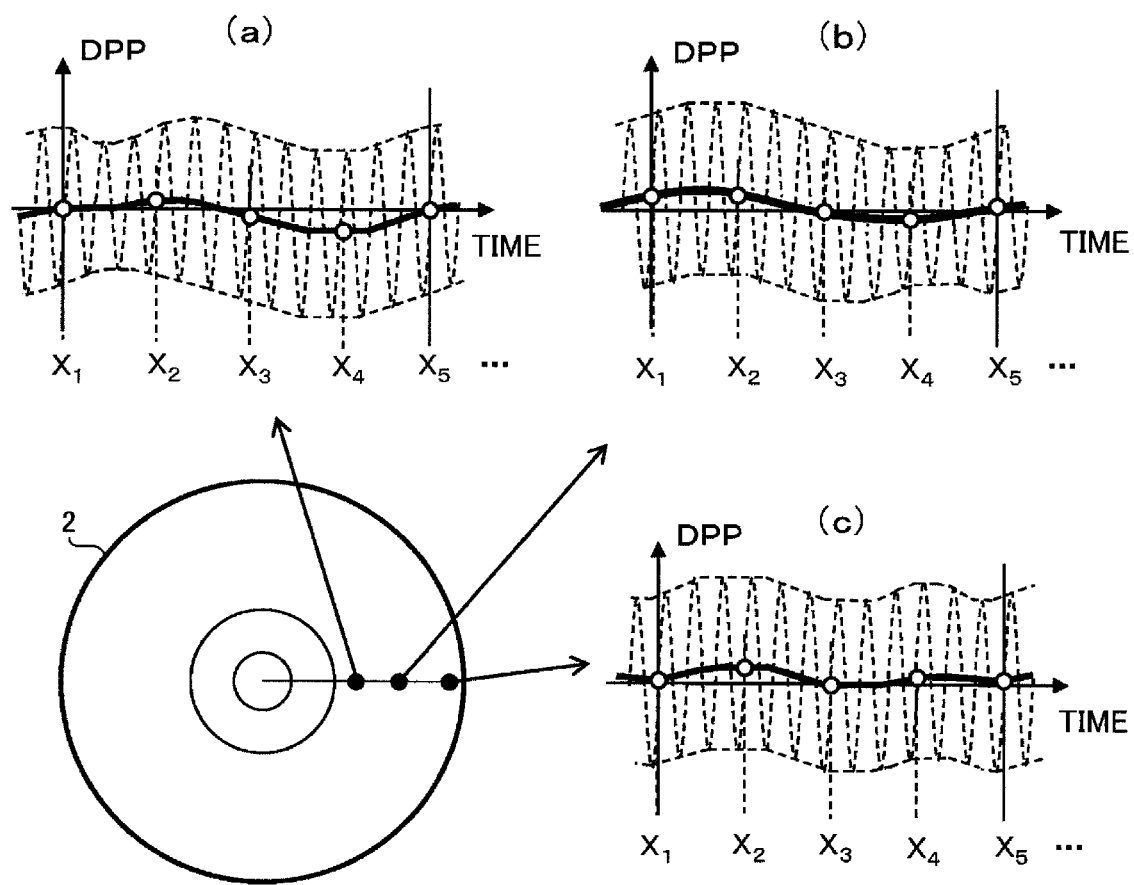
FIG. 7 is a diagram illustrating the case of learning a DPP signal in the radial direction of a disk.

FIG. 7 is a diagram illustrating the case of learning the DPP signal in the radial direction of a disk. Even on disks having irregularity (eccentricity, warpage, waviness, and a film thickness change) along the radial direction, correcting values can be learned for stable control meeting irregularity unique to disks. A learning sequence is repeated at disk radial positions while changing disk radial positions as illustrated in (a), (b), and (c) in FIG. 7. Thus, the deviation depending on the radius such as disk warpage can be correctly acquired, and faulty learning that occurs only at a specific radial position due to foreign substances, flaws, or the like can be avoided. It is noted that such a configuration may be possible in which those learnings are performed only in the case where a disk is determined as a disk with unstable tracking signals and those learnings are skipped on ordinary disks to accelerate the initial operations.

Figure 8:
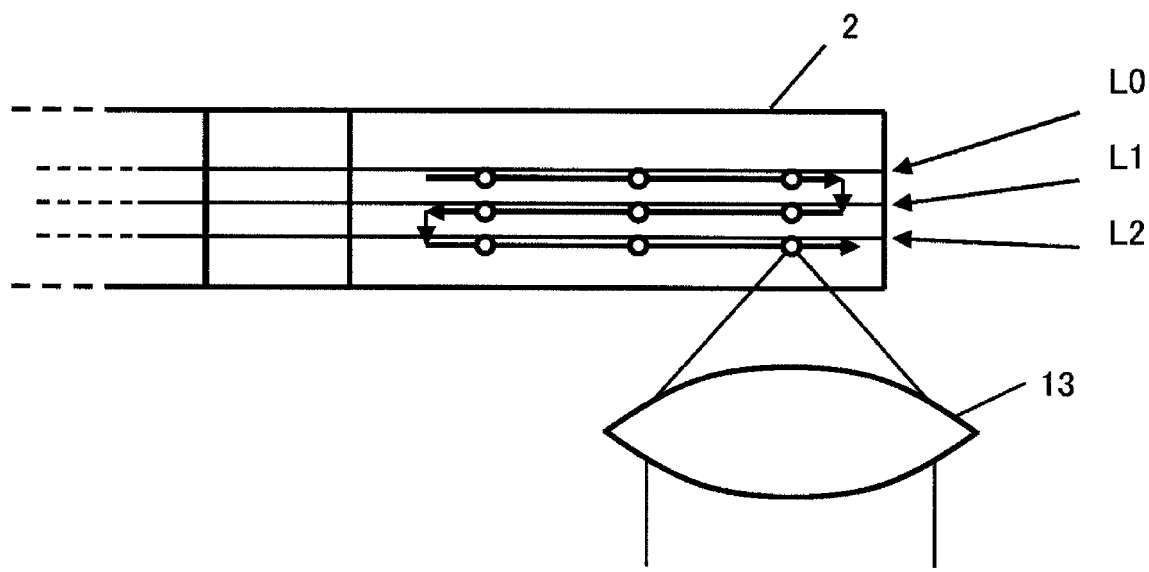
FIG. 8 is a diagram illustrating the case of learning a DPP signal on a multi-layer optical disk.

FIG. 8 is a diagram illustrating the case of learning a DPP signal on a multi-layer optical disk. Here, an example of a three-layer disk is illustrated. In a multi-layer optical disk with three layers or more, reflected light between layers causes a large number of stray light beams to enter the photodetector. The number of stray light beam paths that occur in multiple reflection up to twice is two different paths in a two-layer disk. However, the number of stray light beam paths is eight different paths or more in a three-layer disk, so that the three-layer disk tends to be subject to the influence of stray light four times or more. The stray light is greatly affected by manufacture variations in a distance between disk layers to cause the dependency of a DPP signal on turns of tracks. The influence of stray light causes the non-linearity of the tracking error signal obtained in layers when the lens is shifted to exhibit behaviors differently in layers.

Therefore, correction is individually performed in layers L0, L1, and L2 to obtain an excellent stability of tracking servo control even in using a multi-layer optical disk medium while making use of the effect of this correction. In this case, the correcting values for the tracking error signal are individually learned at disk radial positions in the layers L0, L1, and L2. Thus, the nonlinear offset and amplitude deviation of the tracking error signal caused by stray light unique to the multi-layer disk can be corrected. In the case where a multi-layer disk has a specific track to cause unstable servo control, this learning and correction is applied to the track to correct DPP signal deviation in synchronization with rotation due to stray light for performing re-readout operations in stable tracking servo control.

According to the configuration of this embodiment, the following effect can be obtained.

In this configuration, the amplitude of the tracking error signal that deviates in synchronization with disk rotation is gain-corrected according to the amplitude value of the envelope of the tracking error signal stored when learning. Thus, it is possible to perform correction meeting factors caused other than by the pickup such as the periodical offset deviation of the tracking error signal due to the eccentricity, warpage, deformation, or the like of the disk medium, and it is possible to highly accurately perform correction at low costs in particular.

Learning called LE deviation reproducing servo control that reproduces the deviation of the lens error signal is introduced, so that it is possible to correctly learn the rotation period of the DPP amplitude and the DPP offset in tracking servo control for the first time, and it is possible to perform proper correction. The amplitude of the tracking error signal is corrected to correct a reduction in the amplitude of the tracking error signal due to the visual field characteristics even in an optical disk medium with a large eccentricity, and stable tracking servo control is implemented.

In the conventional techniques, in the case where the feedback of an error signal is controlled in such a way that the feedback of the error signal itself becomes zero, it is difficult to estimate the lens shift value while tracking servo control is on. On the contrary, in this configuration, an LE signal corresponding to the lens shift value is detected even while tracking servo control is on, so that it is possible to correct general k-values.

The offset deviation in association with the disk rotation angle is first learned, and then the deviation of the tracking error signal is corrected in synchronization with disk rotation based on the learning result. Thus, it is advantageous that correction can be freely performed even in the case where there are a plurality of different factors such as the angle shift of the pickup and disk eccentricity. Since the amplitude deviation and the offset deviation in the deviation of the tracking error signal are also subject to the influence of disk eccentricity as well as the influence of the off-center objective lens of the pickup (a position shift in the direction vertical to the radius), those factors independently cause the amplitude deviation and the offset deviation accompanied by a phase shift. Therefore, even though the lens shift value (the LE signal) is the same, such a phenomenon appears that the amplitude is different in eccentricity between going and returning paths. Accordingly, in order to correct the amplitude deviation and the offset deviation both in going and returning paths, it is essential to perform correction in a rotation period in synchronization with a disk rotation period. In this configuration, it is possible to correct those deviations. The amplitude and the offset are simultaneously corrected to allow stable servo control throughout one turn of the disk, and the stability of the optical disk apparatus is dramatically improved. Learning is performed at a plurality of rotation angle positions such as three points or more per turn. Thus, it is possible to correct the deviation of the tracking error signal depending on rotation such as disk warpage, which is difficult to be corrected using only the LE signal.

The lens shift signal (the LE signal here) is corrected with the sum total of the photodetected signal output (by subtraction, for example), so that it is possible to avoid the deviation of a local reflectance of the disk when learning. Namely, signals corresponding to the accurate lens shift positions can be obtained by correction regardless of differences between operating conditions such as differences between a data recorded area and a data unrecorded area and differences between recording data and reading data. Thus, it is possible to obtain an accurate correcting signal for the tracking error signal with high reproducibility, and it is possible to provide highly accurate correction.

Even in the case where the value of the LE signal is distorted with respect to the actual lens shift value, a reference is made to the same LE signal when learning and correction according to LE deviation reproducing servo control, so that it is possible to correctly learn the deviation of the DPP signal regardless of the distortion of the LE signal, and it is possible to implement accurate correction.

Since the accuracy of the mechanical neutral position of the objective lens is unnecessary, the learning result is not disturbed due to vibrations in the surroundings, so that it is possible to perform accurate learning and correction even under vibrations as the apparatus is mounted on a vehicle, for example.

Since only the nonlinear offset component of the tracking error signal is corrected, the correction accuracy of the tracking error signal is improved. The number of bits to store values for correction and the number of bits for analogue-digital conversion are small, the arithmetic operation accuracy of linear interpolation for correction is also low, and the arithmetic operation time (sampling rate) of values for correction and the frequency of correction output response are also low. Thus, costs are reduced. Moreover, since the learning accuracy of the correcting value is low, time necessary for learning is shortened, and preparation operations are accelerated.

In the correction method according to this configuration, the correcting functionality in synchronization with rotation can be used for the additional functionality for the general k-values correction. Namely, the learning operation is performed for generating correcting values according to LE deviation reproducing servo control only in the case where the correcting signal generator 28 detects that a DPP signal generated by general k-value correction includes a lot of amplitude deviation and nonlinear offset components. Thus, in the normal operation in which the amplitude deviation and nonlinear offset of the DPP signal cause no problem, the learning operation of correction in synchronization with rotation is skipped to start the optical disk apparatus much faster. In the case where the learning operation is skipped, it is sufficient that the amplitude correcting gain is set to one time and the offset correcting signal is set to zero.

In this configuration, learning enables correction also meeting variations in individual pickups at low costs.

This configuration can also be used for the three-beam method in which a part of the sub-spot is omitted as described in FIGS. 11A and 11B. In the general three-beam method described in FIGS. 10A and 10B, non-linearity is small because the linearity of a change in the lens shift signal with respect to the lens shift is relatively excellent. On the contrary, in the case of the modified three-beam method in FIGS. 11A and 11B in which a part of the sub-spot detector plane is omitted for the measures against coherent light problem between two layers, the shapes of the light-receiving surfaces of the sub-spot and the main spot are different, so that the non-linearity or a amplitude change in the lens shift signal in association with a lens shift is larger than in methods such as the general three-beam method. Thus, it is possible to obtain a large effect of improvement because of nonlinear component correction. Also in an optical system according to the three-beam method with a partially omitted detector plane, it is possible that this configuration corrects the deviations of the amplitude and offset of the tracking error signal for stable servo control, although amplitude tends to change due to the non-linearity of the DPP signal and the visual field characteristics.

This configuration can also be used for the single beam method described in FIGS. 12A to 12C. Since in the single beam method, the visual field is theoretically changed in association with a lens shift (a shift between the going path and the return path of the light beam in the beam effective diameter), the non-linearity of a change in the lens shift signal in association with a lens shift is larger than in other methods such as the general three-beam method, and it is possible to obtain a large effect of improvement because of nonlinear component correction. It is possible to correct the deviations of the amplitude and offset of the tracking error signal in an optical system according to the single beam method in which the amplitude tends to change due to the non-linearity of the DPP signal and the visual field characteristics, and it is possible to perform stable servo control.

In this configuration, since spline interpolation is used to perform the interpolation process for the correcting value, it is possible to suppress the number of the disk rotation angle positions to be learned to the minimum. In other words, it is possible to suppress the time necessary for learning to the shortest, and it is possible to accelerate the preparation steps of the optical disk apparatus. The correcting value is fit beforehand, so that it is possible to prevent faulty correcting values due to noise by averaging, and it is possible to provide highly accurate control. Moreover, the information volume of the tracking error signal to be stored can be made smaller, so that it is possible to suppress the use amount of the memory for a reduction in costs. Furthermore, since the nonvolatile memory 39 to store the learning result is provided to beforehand perform processing after turning on tracking servo control, it is possible to accelerate the servo process.

[Second Embodiment]

FIG. 9 is a diagram illustrating the overall configuration of a second embodiment of the optical disk apparatus according to the present invention. The overall configuration of the apparatus is almost the same as in the first embodiment (FIG. 1), and the difference is in that correcting portions for the offset of the tracking error signal are changed. More specifically, a correcting signal generator 28 outputs a gain balance correcting signal 29b instead of the offset correcting signal 29a, and supplies the gain balance correcting signal 29b to variable-gain amplifiers 27a and 27b in a servo signal generator 25. The variable-gain amplifiers 27a and 27b amplify two base signals SPP1 and SPP2, respectively, which generate an SPP signal. The difference between the amplified signals becomes a sub push-pull signal SPP, and the sub push-pull signal SPP and a main push-pull signal MPP are calculated to generate a tracking error signal (DPP) 21. Here, the gain balance correcting signal 29b is made of a pair of a signal that the gain is increased to (1+g) according to an offset correcting value g and a signal that the gain is reduced to (1−g) according to the correcting value.

This operation is additionally illustrated in (h) in FIG. 4. The base signals SPP1 and SPP2 include a direct current component in addition to a push-pull signal component (an alternating component). The gains of the variable-gain amplifiers 27a and 27b are changed to (1+g) and (1−g) to change the ratio of the direct current component, and the offset value of the SPP signal, which is the differential signal between the variable-gain amplifiers 27a and 27b, can be changed. Thus, as similar to the first embodiment, the offset of the tracking error signal can be corrected.

In the correction of the offset of the tracking error signal according to this embodiment, since the offset of the signal is corrected at a gain ratio (a gain balance) of intermediate signals, it is advantageous that the offset of the tracking error signal after learned and corrected does not tend to be shifted even though the reflectance of a disk is changed. Even in the case where a recorded area and an unrecorded area are switched due to a radial position and an angle position on the disk, or in the case where a reflected light quantity is temporarily changed due to foreign substances and flaws on the disk, the deviation of the light quantity proportional to the total light quantity is cancelled to suppress the deviation of the offset that occurs in the tracking error signal after learned and corrected. Thus, it is advantageous that servo control can be stabilized particularly in recording and reading a recording type disk.

It is noted that this embodiment is a modification of the first embodiment in which the correcting portions for the offset of the tracking error signal in the first embodiment are modified, and the advantages of the exemplary configuration of the first embodiment are also entirely similarly provided in the configuration of this embodiment.

In this embodiment, such a configuration is formed in which the gain balance of the SPP signal is corrected. However, instead of that configuration, such a configuration may be possible in which the gain balance is corrected on the MPP signal or the DPP signal. For example, such methods are also possible in which only the MPP signal is corrected at a gain ratio (1+g):(1−g) and in which the gain balance is corrected at a gain ratio (1+g):(1−g) on the DPP signal generated from the MPP signal and the SPP signal. Moreover, such a method is also possible in which only one side is adjusted as at a gain ratio 1:(1+g) instead of the gain ratio (1+g):(1−g). In this case, the circuits are simplified because the number of the variable-gain amplifiers can be reduced.

The present invention is not limited to the foregoing embodiments, including various exemplary modifications and alterations.

The correcting signal generator 28 stores the amplitude correcting gain that the reciprocal of the amplitude value of the tracking error signal is clipped within a certain value by learning the deviation of the tracking error signal. Instead of this configuration, such a configuration may be possible in which the correcting signal generator 28 stores the amplitude value itself, the reciprocal value (the amplitude correcting gain) of an amplitude value can immediately be used for correction, and a value clipped within a certain value is generated and supplied to the multiplier 56. In that case, it is possible to reduce processing when learning.

Moreover, the correcting signal generator 28 may store a pair of the values of the top envelope signal 57 and the bottom envelope signal 58 of the tracking error signal 21 instead of storing a pair of the amplitude value and the offset value. Also in this case, it is possible to reduce processing when learning. In order to implement this, it is sufficient that the correcting signal generator 28 is disposed on the subsequent stage of the peak maximum value detector 47 and the peak minimum value detector 48. In consideration of the degree of freedom of those components, the correcting signal generator 28 according to the embodiment can store any one item of information including the pair of the values of the top envelope signal 57 and the bottom envelope signal 58, the amplitude and reciprocal value of the tracking error signal, and the value that the reciprocal value is clipped within a certain value. Those items of information are generally referred to as tracking error signal amplitude information.

The present invention is also applicable to other optical recording apparatuses that detect tracking using interference, for example.

The foregoing embodiments are described in detail for easily understanding the present invention, and the invention is not limited to the embodiments including all of the described configurations. Moreover, a part of the configuration of one embodiment can be replaced by the configuration of the other embodiment, and the configuration of one embodiment can be added with the configuration of the other embodiment. Furthermore, a part of the configuration of the embodiments can be added with the other configuration, can be removed, and can be replaced by the other configuration.

What is claimed is:

1. An optical disk apparatus comprising:
an optical pickup, wherein the optical pickup includes:
    a light source,
    an objective lens configured to collect a laser beam emitted from the light source and apply the laser beam onto an optical disk,
    an actuator configured to drive the objective lens, and
    a photodetector configured to detect reflected light from the optical disk and output a photodetected signal; and
a signal processing circuit, wherein the signal processing circuit includes:
    a servo signal generator configured to generate a tracking error signal and a lens error signal from the photodetected signal outputted from the photodetector,
    a lens error deviation signal memory circuit configured to store the lens error signal generated at the servo signal generator and reproduce a deviation of the lens error signal in synchronization with disk rotation, and
    a tracking error signal corrector configured to receive the tracking error signal and learn and generate an amplitude correcting value that corrects an amplitude deviation of the tracking error signal;
wherein the amplitude correcting value for the tracking error signal learned at the tracking error signal corrector is acquired from a tracking error signal detected in reproducing the deviation of the lens error signal;
wherein the tracking error signal corrector includes a correcting signal generator configured to store the amplitude correcting value or the offset correcting value for the tracking error signal at a plurality of disk rotation angles in synchronization with rotation of the optical disk in a learning operation; and
wherein in a recording operation or a readout operation, a correcting value corresponding to a disk rotation angle to be a subject to the recording and readout operations is read out of the correcting signal generator in synchronization with rotation of the optical disk, and a tracking error signal is corrected.

2. The optical disk apparatus according to claim 1, wherein:
the tracking error signal corrector performs the learning operation in a state in which tracking servo control is off while focus servo control is on; and the tracking error signal corrector detects a top envelope and a bottom envelope of a tracking error signal at a plurality of disk rotation angle positions in synchronization with rotation of the optical disk, and acquires an amplitude correcting value and an offset correcting value from the envelopes.

3. An optical disk apparatus comprising:
an optical pickup wherein the optical pickup includes:
    a light source,
    an objective lens configured to collect a laser beam emitted from the light source and apply the laser beam onto an optical disk,
    an actuator configured to drive the objective lens, and
    a photodetector configured to detect reflected light from the optical disk and output a photodetected signal; and
a signal processing circuit, wherein the signal processing circuit includes:
    a servo signal generator configured to generate a tracking error signal and a lens error signal from the photodetected signal outputted from the photodetector,
    a lens error deviation signal memory circuit configured to store the lens error signal generated at the servo signal generator and reproduce a deviation of the lens error signal in synchronization with disk rotation, and
    a tracking error signal corrector configured to receive the tracking error signal and learn and generate an amplitude correcting value that corrects an amplitude deviation of the tracking error signal;
wherein the amplitude correcting value for the tracking error signal learned at the tracking error signal corrector is acquired from a tracking error signal detected in reproducing the deviation of the lens error signal; and
wherein the tracking error signal corrector includes an inverse signal generator having a clipping functionality that finds a reciprocal value of an amplitude value of the tracking error signal in order to acquire the amplitude correcting value and restricts a maximum value of the reciprocal value within a certain value.

4. An optical disk apparatus comprising:
an optical pickup; and
a signal processing circuit, wherein:
the optical pickup includes:
    a light source;
    an objective lens configured to collect a laser beam emitted from the light source and apply the laser beam onto an optical disk;
    an actuator configured to drive the objective lens; and
    a photodetector configured to detect reflected light from the optical disk and output a photodetected signal; and
the signal processing circuit includes:
    a servo signal generator configured to generate a tracking error signal and a lens shift signal from the photodetected signal outputted from the photodetector;
    a lens shift signal deviation storing and reproducing unit configured to receive the lens shift signal and a disk rotation angle detection signal and store and reproduce a deviation of the lens shift signal in synchronization with disk rotation;
    a servo circuit configured to drive the objective lens so as to match with a deviation of the reproduced lens shift signal and control a lens shift value in synchronization with disk rotation; and
    a tracking error signal amplitude deviation storing unit configured to receive the amplitude of the tracking error signal and the disk rotation angle detection signal; and
the tracking error signal amplitude deviation storing unit stores a deviation of an amplitude of the tracking error signal in synchronization with the disk rotation angle detection signal in reproducing the deviation of the lens shift signal and corrects a tracking servo control loop gain in synchronization with disk rotation of the tracking error signal after finishing the reproducing of the deviation.

5. An optical disk apparatus comprising:
an optical pickup; and
a signal processing circuit, wherein:
the optical pickup includes:
  a light source;
  an objective lens configured to collect a laser beam emitted from the light source and apply the laser beam onto an optical disk;
  an actuator configured to drive the objective lens; and
  a photodetector configured to detect reflected light from the optical disk and output a photodetected signal;
the signal processing circuit includes:
  a servo signal generator configured to generate a main push-pull signal and a sub push-pull signal from the photodetected signal outputted from the photodetector and generate a differential push-pull signal and a lens error signal from the main push-pull signal and the sub push-pull signal;
  a lens error signal deviation reproducing unit configured to learn and reproduce a deviation of the lens error signal generated at the servo signal generator in synchronization with a disk rotation angle detection signal; and
  a tracking error signal corrector configured to generate an amplitude correcting value for an amplitude deviation of a differential push-pull signal in synchronization with the disk rotation angle detection signal; and
an amplitude deviation of the differential push-pull signal in synchronization with disk rotation is corrected using an amplitude correcting value generated at the tracking error signal corrector.

6. The optical disk apparatus according to claim 5, wherein the tracking error signal corrector simultaneously generates an amplitude correcting value for the differential push-pull signal and an offset correcting value that corrects an offset of the differential push-pull signal.

7. The optical disk apparatus according to claim 6, wherein the tracking error signal corrector generates a gain balance correcting value in order to correct an offset of the differential push-pull signal, supplies the generated gain balance correcting value to the servo signal generator, and adjusts a gain balance of the main push-pull signal or the sub push-pull signal.

8. The optical disk apparatus according to claim 5, wherein the tracking error signal corrector includes a correcting signal generator configured to store an amplitude correcting value or an offset correcting value for the sub push-pull signal at a plurality of disk rotation angles in synchronization with rotation of the optical disk; and
  in a recording operation or a readout operation, a correcting value is read out of the correcting signal generator in synchronization with rotation of the optical disk, and a correcting value corresponding to a disk rotation angle that is a subject to the recording and the readout operations is generated by spline interpolation.

9. The optical disk apparatus according to claim 5, wherein the photodetector and the servo signal generator generate the differential push-pull signal and the lens error signal according to a three-beam method in which a part of a sub-spot detector plane is omitted.

10. The optical disk apparatus according to claim 5, wherein the photodetector and the servo signal generator generate the differential push-pull signal and the lens error signal according to a single beam method.

* * * * *